US008302402B2

(12) United States Patent
Boley et al.

(10) Patent No.: US 8,302,402 B2
(45) Date of Patent: Nov. 6, 2012

(54) AIR INDUCTION SYSTEM WITH RECIRCULATION LOOP

(75) Inventors: William Christopher Boley, Lafayette, IN (US); Stuart Raymond Niese, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 662 days.

(21) Appl. No.: 12/007,404

(22) Filed: Jan. 10, 2008

(65) Prior Publication Data

US 2009/0178655 A1 Jul. 16, 2009

(51) Int. Cl.
*F02B 33/44* (2006.01)
(52) U.S. Cl. .................................................. 60/611
(58) Field of Classification Search ............... 123/559.1, 123/559.2, 564; 60/597, 598, 600, 605, 611
See application file for complete search history.

(56) References Cited

U.S. PATENT DOCUMENTS

| | | | |
|---|---|---|---|
| 3,196,606 A | 7/1965 | Cholvin et al. | |
| 3,568,435 A | 3/1971 | May | |
| 4,222,240 A | 9/1980 | Castellano | |
| 4,282,713 A | 8/1981 | Antoku et al. | |
| 4,434,775 A * | 3/1984 | Yoshimura et al. | 123/564 |
| 5,083,543 A * | 1/1992 | Harada et al. | 123/492 |
| 5,155,999 A | 10/1992 | Hashimoto et al. | |
| 5,173,021 A | 12/1992 | Grainger et al. | |
| 5,201,790 A * | 4/1993 | Mukai et al. | 60/612 |
| 5,819,538 A | 10/1998 | Lawson, Jr. | |
| 6,018,949 A * | 2/2000 | Brosecke et al. | 60/602 |
| 6,052,995 A | 4/2000 | Krimmer et al. | |
| 6,055,811 A | 5/2000 | Maddock et al. | |
| 6,112,523 A | 9/2000 | Kamo et al. | |
| 6,161,384 A * | 12/2000 | Reinbold et al. | 60/602 |
| 6,318,085 B1 * | 11/2001 | Torno et al. | 60/611 |
| 6,363,721 B1 | 4/2002 | Prenninger et al. | |
| 6,557,346 B1 | 5/2003 | Oetting et al. | |
| 6,722,128 B1 | 4/2004 | Adrian | |
| 6,732,522 B2 | 5/2004 | Wright et al. | |
| 6,751,956 B2 | 6/2004 | Mayer et al. | |
| 6,981,369 B2 | 1/2006 | Miura | |
| 6,983,597 B2 * | 1/2006 | Wild et al. | 60/611 |
| 7,010,914 B1 | 3/2006 | Roberts, Jr. et al. | |
| 7,404,293 B2 * | 7/2008 | Ozawa | 60/611 |
| 7,654,086 B2 * | 2/2010 | Gong et al. | 60/611 |
| 2005/0204730 A1 * | 9/2005 | Tsukahara et al. | 60/290 |
| 2005/0279092 A1 * | 12/2005 | Ozawa | 60/599 |
| 2007/0215118 A1 * | 9/2007 | Komori et al. | 123/478 |
| 2007/0215124 A1 * | 9/2007 | Ozaki et al. | 123/559.1 |
| 2009/0007563 A1 * | 1/2009 | Cooper et al. | 60/600 |

* cited by examiner

*Primary Examiner* — Mary A Davis
(74) *Attorney, Agent, or Firm* — Finnegan, Henderson, Farabow, Garrett & Dunner LLP

(57) ABSTRACT

An air induction system for a power system is provided having a compressor operable to compress air directed into an engine. In addition, the air induction system has a throttle valve disposed between the compressor and the engine, the throttle valve being configured to selectively restrict the flow of compressed air into the engine. The air induction system also has a recirculation valve disposed between the compressor and the throttle valve, the recirculation valve being configured to selectively divert a portion of the flow of compressed air. Furthermore, the air induction system has a controller configured to actuate the recirculation valve in response to a pressure differential between air upstream of the throttle valve and air downstream of the throttle valve.

14 Claims, 2 Drawing Sheets

AIR INDUCTION SYSTEM WITH RECIRCULATION LOOP

TECHNICAL FIELD

The present disclosure is directed to an air induction system and, more particularly, to an air induction system having a recirculation loop.

BACKGROUND

Turbocharger systems increase the power and efficiency of internal combustion engines by providing the engine with intake fluid at higher than atmospheric pressure. Conventional turbocharger systems include a turbine driven by exhaust energy from the engine, and a compressor driven by the turbine. The compressor pressurizes fluid, previously at or near atmospheric pressure, for travel through a throttle valve and aftercooler and into an engine intake manifold.

Several problems have been experienced with previously known turbocharger configurations. For example, turbochargers generally take some time to gain speed and provide increased pressure when increased power demands are placed on the system. This generally is the result of rotational inertia of the turbocharger. Therefore, when the engine is operating under transient conditions that require a quick increase in power, a delay period occurs while the turbocharger accelerates, preventing the desired instantaneous increase in power. This also holds true when the engine is operating under conditions that require quick decreases in power and pressure.

One solution that has been employed to reduce such time lag is maintaining a reserve of pressurized air ("boost") upstream of the throttle valve. This reserve of pressurized air may be released when increased power demands require a rapid increase of inlet air pressure. A compressed air recirculation loop is often implemented with the above mentioned solution to prevent the pressure of the reserve air from exceeding a desired threshold, above which the reserve pressure may adversely affect the performance of the engine or even result in engine damage.

An example of a compressed air recirculation loop can be found in U.S. Pat. No. 6,318,085 (the '085 patent) issued to Torna et al. on Nov. 20, 2001. The compressed air recirculation loop disclosed in the '085 patent is fluidly connected to an air intake of a compressor. In addition, the recirculation loop is fluidly connected to an engine inlet passage downstream of the compressor. The engine inlet passage includes a throttle valve for controlling the flow of air into the engine. Furthermore, a recirculation valve situated within the recirculation loop regulates the flow of pressurized air back to the intake of the compressor. A sensor situated downstream of the throttle valve senses the pressure of air entering the engine, while another sensor, associated with the throttle valve, senses the position of the throttle valve. The recirculation valve is actuated based on the pressure of the air entering the engine and the position of the throttle valve to maintain the pressure of the air entering the engine at a desired pressure.

Although the system disclosed in the '085 patent utilizes a compressed air recirculation loop, its effect on the transient response of the turbocharger may be limited. In particular the '085 system does not sense the boost pressure upstream of the throttle valve. This may allow the actual boost pressure to become less than a desired boost pressure. If the pressure becomes too low, there may not be enough reserve of pressurized air to meet the demands of an increased load acting on the engine.

The disclosed system is directed to overcoming one or more of the problems set forth above.

SUMMARY

In one aspect, the present disclosure is directed toward an air induction system for a power system. The air induction system includes a compressor operable to compress air directed into an engine. In addition, the air induction system includes a throttle valve disposed between the compressor and the engine, the throttle valve being configured to selectively restrict the flow of compressed air into the engine. The air induction system also includes a recirculation valve disposed between the compressor and the throttle valve, the recirculation valve being configured to selectively divert a portion of the flow of compressed air. Furthermore, the air induction system includes a controller configured to actuate the recirculation valve in response to a pressure differential between air upstream of the throttle valve and air downstream of the throttle valve.

Consistent with a further aspect of the disclosure, a method is provided for maintaining a pressure differential between air upstream and downstream of a throttle valve. The method includes compressing a flow of air. In addition, the method includes sensing a first parameter indicative of a pressure of air upstream of the throttle valve. The method also includes sensing a second parameter indicative of a pressure of air downstream of the throttle valve. The method further includes selectively diverting at least a portion of the compressed air in response to a difference between the pressure of the air upstream of the throttle valve and the pressure of the air downstream of the throttle valve.

DETAILED DESCRIPTION

Figure 1:
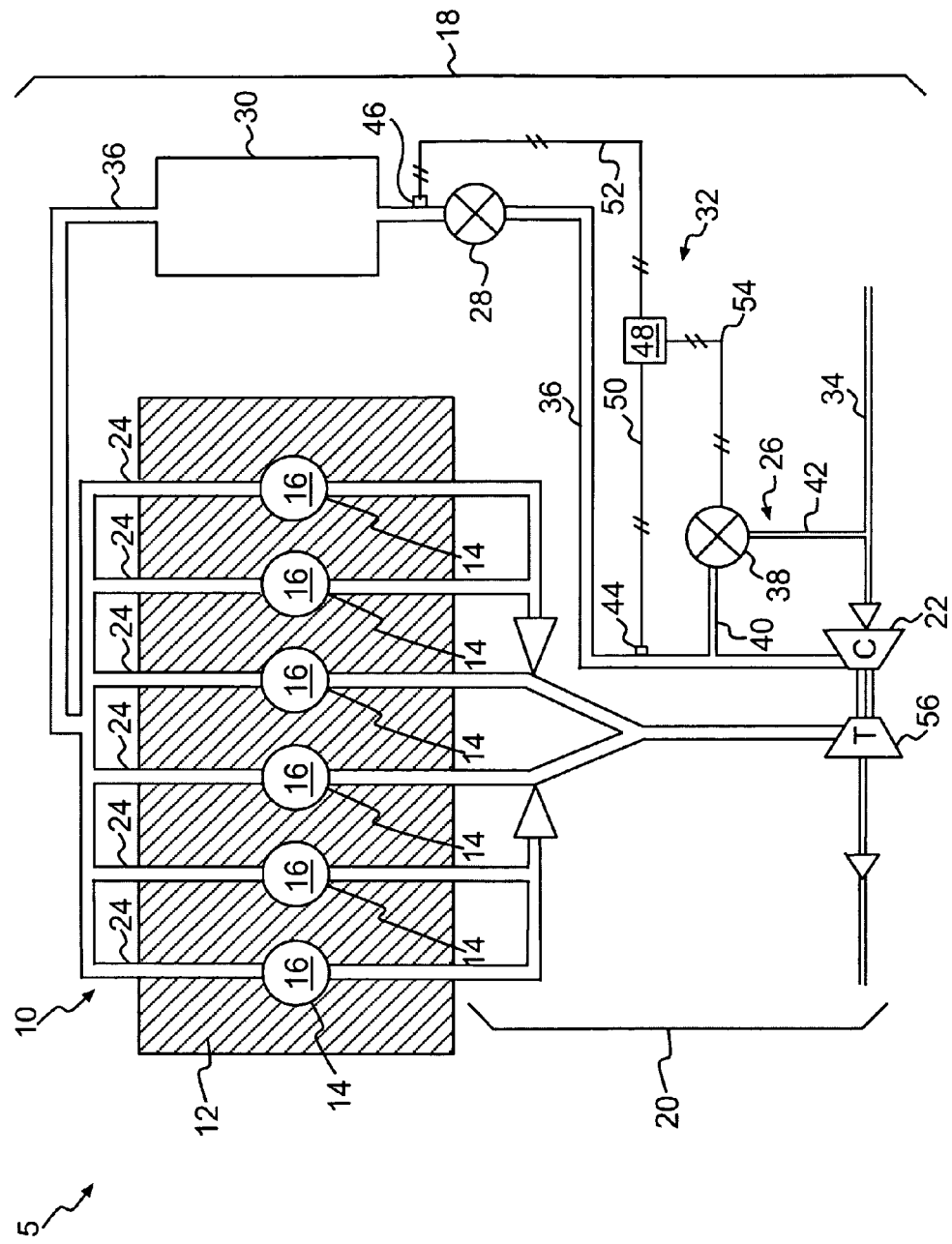
FIG. 1 is a diagrammatic illustration of an exemplary disclosed power system.

FIG. 1 illustrates an exemplary disclosed power system 5 having multiple components that cooperate to produce a power output. Power system 5 may include an engine 10 having an engine block 12 that defines a plurality of cylinders 14, a piston (not shown) slidably disposed within each cylinder 14, and a cylinder head (not shown) associated with each cylinder 14. It is contemplated that engine 10 may include additional or different components such as, for example, a valve mechanism associated with each cylinder head, one or more fuel injectors, and other components known in the art. For the purposes of this disclosure, engine 10 is depicted and described as a gaseous fuel-powered engine. One skilled in the art will recognize, however, that engine 10 may embody any other type of internal combustion engine such as, for example, a gasoline or diesel powered engine.

The piston, cylinder head, and cylinder 14 may form a combustion chamber 16. In the illustrated embodiment, engine 10 includes six combustion chambers 16. However, it is contemplated that engine 10 may include a greater or lesser number of combustion chambers 16 and that the combustion chambers 16 may be disposed in an "in-line" configuration, a "V" configuration, or any other suitable configuration.

As also shown in FIG. 1, power system 5 may include a plurality of systems that facilitate production of the power output. In particular, power system 5 may include an air induction system 18 and an exhaust system 20. It is contemplated that engine 10 may include additional systems such as, for example, a fuel system, a lubrication system, a transmission system, a cooling system, and other such engine systems that are known in the art.

Air induction system 18 may introduce charged air into combustion chambers 16 of engine 10. In addition, air induction system 18 may include a compressor 22 in fluid communication with one or more inlet ports 24 of each cylinder head, a recirculation system 26, a throttle valve 28, an air cooler 30, and a control system 32. It is contemplated that additional and/or different components may be included within air induction system 18 such as, for example, an air cleaner and other means known in the art for introducing charged air into combustion chambers 16.

Compressor 22 may receive atmospheric air via an inlet 34 and compress the received air to a predetermined pressure level. In addition, compressor 22 may direct the compressed air to inlet ports 24 via a fluid conduit 36. Furthermore, compressor 22 may embody a fixed geometry compressor, a variable geometry compressor, or any other type of compressor known in the art. It is contemplated that multiple compressors 22 may alternatively be included within air induction system 18 and disposed in a series or parallel relationship, if desired.

Recirculation system 26 may maintain the air located downstream of compressor 22 and upstream of throttle valve 28 at a desired pressure by recirculating some of the compressed air back to inlet 34. Recirculation system 30 may include a recirculation valve 38 fluidly connected to fluid conduit 36 at a point downstream of compressor 22 and upstream of throttle valve 28 via a fluid conduit 40. In addition, recirculation valve 38 may be fluidly connected to inlet 34 via a fluid conduit 42. Recirculation valve 38 may be adjustable to control the amount of compressed air delivered to combustion chambers 16. In particular, recirculation valve 38 may be adjustable from a flow blocking position toward a flow passing position. The flow blocking position may direct substantially all of the compressed air from compressor 22 to flow toward engine 10, and may resist a spring bias toward the flow-passing position. The flow passing position may cause a portion of the compressed air from compressor 22 to be diverted from engine 10 at the point downstream of compressor 22 to the point upstream of compressor 22 via fluid conduits 40 and 42. Recirculation valve 38 may include a butterfly valve element, a spool valve element, a shutter valve element, a check valve element, a diaphragm valve element, a gate valve element, a shuttle valve element, a ball valve element, a globe valve element, or any other type of valve element known in the art. In addition, recirculation valve 38 may be electrically, hydraulically, or pneumatically actuated.

Throttle valve 28 may be located within fluid conduit 36 between compressor 22 and inlet ports 24 to control the amount of air delivered to combustion chambers 16. The location of throttle valve 28 may be any suitable position within fluid conduit 36 such as, for example, before or after air cooler 30. In addition, throttle valve 28 may be adjustable from a flow-passing position, resisting a spring bias, toward a flow-restricting position. When in the flow-passing position, air may be directed into engine 10 substantially unrestricted. The term restricted, for the purposes of this disclosure, is to be interpreted as at least partially blocked from fluid flow. It is also contemplated that throttle valve 28, when in the flow-restricting position, may fully block fluid flow. Throttle valve 28 may include a butterfly valve element, a spool valve element, a shutter valve element, a check valve element, a diaphragm valve element, a gate valve element, a shuttle valve element, a ball valve element, a globe valve element, or any other type of valve element known in the art. In addition, throttle valve 28 may be electrically, hydraulically, or pneumatically actuated.

Air cooler 30 may embody an air-to-air heat exchanger or an air-to-liquid heat exchanger in fluid communication with fluid conduit 36. Air cooler 30 may be configured to transfer heat to or from the air compressed by compressors 22, prior to the compressed air entering combustion chambers 16 of engine 10. In addition, air cooler 30 may include a tube and shell type heat exchanger, a plate type heat exchanger, or any other type of heat exchanger known in the art. It is contemplated that air cooler 30 may be omitted, if desired.

Control system 32 may be configured to affect operation of recirculation valve 38 in response to one or more inputs. In particular, control system 32 may include a pressure sensor 44 positioned upstream of throttle valve 28, a pressure sensor 46 positioned downstream of throttle valve 28, and a controller 46 for actuating recirculation valve 38 in response to signals received from pressure sensors 44 and 46.

Pressure sensor 44 may embody a sensing device configured to sense a parameter indicative of a pressure of air located upstream of throttle valve 28. In addition, sensor 44 may generate a signal indicative of the air pressure and may transmit the signal to controller 48 via a communication line 50. It is contemplated that pressure sensor 44 may be in fluid communication with fluid conduit 36 at any point between compressor 22 and throttle valve 28. It is further contemplated that pressure sensor 44 may be any type of sensing device capable of sensing a parameter indicative of the pressure of air located upstream of throttle valve 28.

Pressure sensor 46 may embody a sensing device configured to sense a parameter indicative of a pressure of air located downstream of throttle valve 28. In addition, sensor 46 may generate a signal indicative of the air pressure and may transmit the signal to controller 48 via a communication line 52. It is contemplated that pressure sensor 46 may be in fluid communication with fluid conduit 36 at any point between throttle valve 28 and combustion chambers 16. It is further contemplated that pressure sensor 46 may be any type of sensing device capable of sensing a parameter indicative of the pressure of air located downstream of throttle valve 28.

Controller 48 may actuate recirculation valve 38 via a communication line 54 in response to signals received from pressure sensors 44 and 46. The actuation of recirculation valve 38 may cause the pressure differential between air upstream and downstream of throttle valve 28 to be maintained at a desired pressure or within a desired range. For example, it may be desired to maintain the air upstream of throttle valve 28 at a pressure approximately 15% greater than the air downstream of throttle valve 28. If the pressure differential rises above the desired 15%, controller 48 may actuate recirculation valve 38 to increase the amount of air being directed through recirculation system 26, thereby reducing the pressure of the air upstream of throttle valve 28 and ultimately reducing the pressure differential. Controller 48 may also actuate recirculation valve 28 to increase the amount of air being directed through recirculation system 26 to maintain the pressure differential at the desired level when the pressure of air downstream of throttle valve 28 decreases. Conversely, if the pressure differential falls below the desired 15%, controller 48 may actuate recirculation valve 38 to decrease the amount of air being directed through recirculation system 26, thereby increasing the pressure of the air upstream of throttle valve 28 and ultimately increasing the pressure differential. Controller 48 may also actuate recirculation valve 28 to decrease the amount of air being directed through recirculation system 26 to maintain the pressure differential at the desired level when the pressure of air downstream of throttle valve 28 increases. It is contemplated that pressure sensors 44 and 46 may be omitted, if desired. In such an embodiment, controller 48 may receive signals from other sensors (not shown) configured to sense various parameters related to the operation of engine 10 and compare such signals to various maps, algorithms, charts, and/or graphs to determine the pressures of the air upstream and downstream of throttle valve 28.

Controller 48 may take any form such as, for example, a computer based system, a microprocessor based system, a microcontroller, or any other suitable control type circuit or system. In addition, controller 48 may include various components for running software applications designed to regulate recirculation valve 38. For example, controller 48 may include a central processing unit (CPU), a random access memory (RAM), input/output (I/O) elements, etc. It is contemplated that controller 48 may be part of any other control system associated with engine 10, if desired.

Exhaust system 20 may direct exhaust flow out of engine 10. For example, exhaust system 20 may include a turbine 58 connected to receive exhaust from engine 10. It is contemplated that exhaust system 20 may include additional and/or different components such as, for example, emission controlling devices such as particulate traps, NOx absorbers, or other catalytic devices, attenuation devices, and other means known in the art for directing exhaust flow out of engine 10.

Turbine 58 may be connected to drive compressor 22. In particular, as the hot exhaust gases exiting engine 10 expand against blades (not shown) of turbine 58, turbine 58 may rotate and drive compressor 22. It is contemplated that more than one turbine 58 may alternatively be included within exhaust system 20 and disposed in a parallel or series relationship, if desired. It is also contemplated that turbine 58 may be omitted and compressor 22 driven by engine 10 mechanically, hydraulically, electrically, or in any other manner known in the art, if desired.

Figure 2:
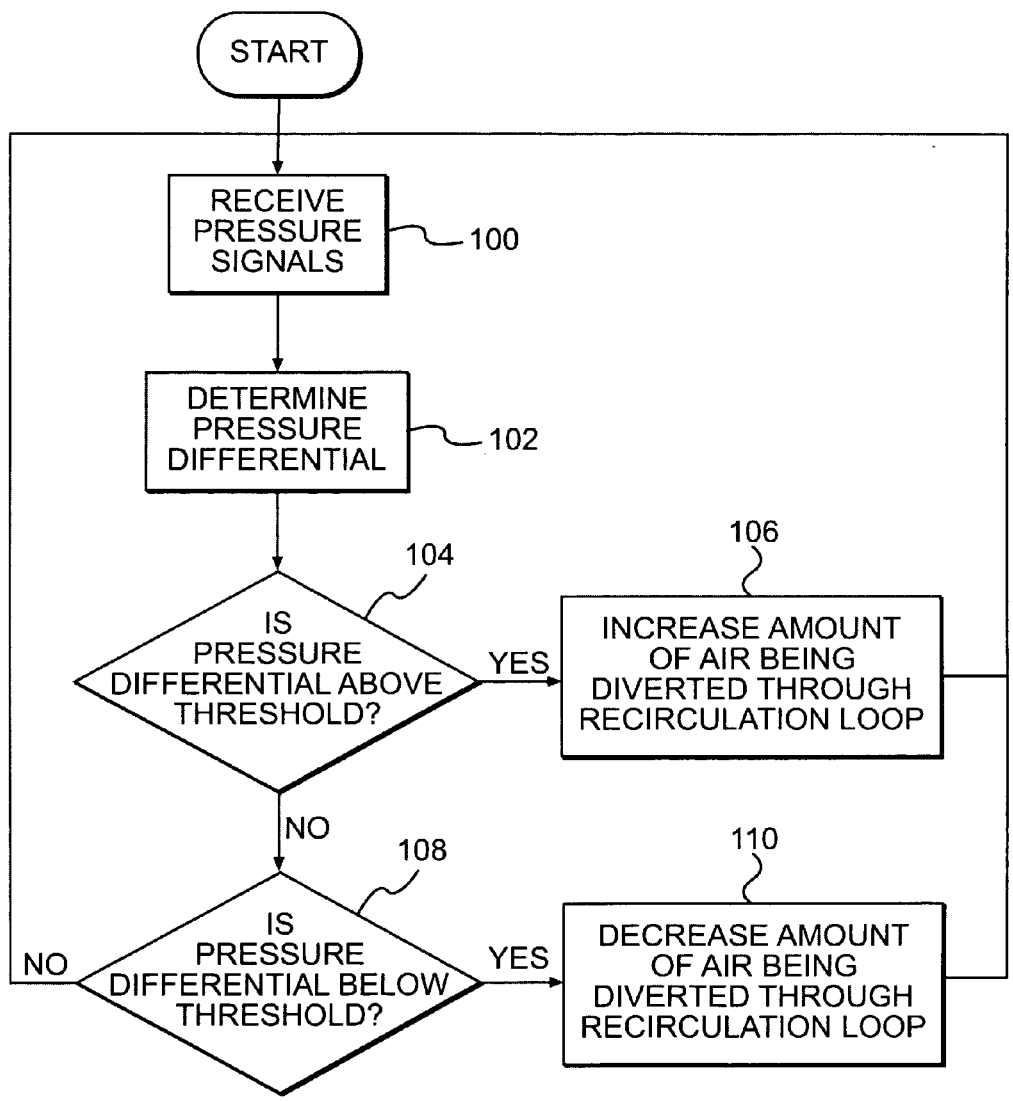
FIG. 2 is a flowchart depicting an exemplary disclosed method for operating a recirculation system of the power system of FIG. 1.

FIG. 2, which is discussed in the following section, illustrates the operation of recirculation system 26. In particular, FIG. 2 illustrates an exemplary method for maintaining the pressure differential between air upstream and downstream of throttle valve 28 at a desired level or within a desired range.

Industrial Applicability

The disclosed recirculation system may be used in any power system where improved turbocharger transient load response is desired. In particular, the disclosed system provides a simple, reliable way to maintain a reserve of charged air at a desired pressure for a rapid turbocharger response to transient loads. The operation of recirculation system 26 will now be explained.

Atmospheric air may be drawn into air induction system 18 via compressor 22 where it may be pressurized to a predetermined level before entering combustion chamber 16 of engine 10. Fuel may be mixed with the pressurized air before or after entering combustion chamber 16. This fuel-air mixture may then be combusted by engine 10 to produce mechanical work and an exhaust flow. The exhaust flow may be directed from engine 10 to turbine 58 where the expansion of hot exhaust gases may cause turbine 58 to rotate, thereby rotating connected compressor 22 to compress the inlet air. After exiting turbine 58, the exhaust gas flow may be directed to the atmosphere.

As illustrated in the flowchart of FIG. 2, controller 48 may receive a signal from pressure sensor 44 indicative of a pressure of the air upstream of throttle valve 28 and may receive a signal from pressure sensor 46 indicative of a pressure of the air downstream of throttle valve 28 (step 100). It is contemplated that pressure sensors 44 and 46 may be omitted from air induction system 18 and that controller 48 may receive signals from various sensors (not shown) related to the operations of engine 10. In such an embodiment, controller 48 may compare the received signals to algorithms, maps, charts, and/or graphs to determine the pressure of air upstream and downstream of the throttle valve. After receiving the pressure signals, controller 48 may compare the pressure signals and calculate a pressure differential between air upstream and air downstream of throttle valve 28 (step 102).

After calculating the pressure differential, controller 48 may determine if the calculated pressure differential is above a first threshold pressure differential (step 104). The first threshold pressure differential may be a preset pressure differential such as, for example, approximately 15.5%. Alternatively, it is contemplated that the pressure differential threshold may be dynamic and may depend on the operation of engine 10, if desired.

If controller 48 determines that the calculated pressure differential is above the first threshold pressure differential (step 104: Yes), controller 48 may actuate recirculation valve 38 to increase the amount of air being diverted back to compressor 22 via recirculation system 26 (step 106). After increasing the amount of air being diverted back to compressor 22, step 100 may be repeated (i.e., controller 48 may receive a signal from pressure sensor 44 indicative of a pressure of the air upstream of throttle valve 28 and may receive a signal from pressure sensor 46 indicative of a pressure of the air downstream of throttle valve 28).

If controller 48 determines that the calculated pressure differential is not above the first threshold pressure differential (step 104: No), controller 48 may determine if the calculated pressure differential is below a second threshold pressure differential (step 108). The second threshold pressure differential may be a preset pressure differential such as, for example, approximately 15%. Alternatively, it is contemplated that the pressure differential threshold may be dynamic and may depend on the operation of engine 10, if desired. It is further contemplated that both the first and second thresholds may be substantially the same.

If controller 48 determines that the calculated pressure differential is below the second threshold pressure differential (step 108: Yes), controller 48 may actuate recirculation valve 38 to decrease the amount of air being diverted back to compressor 22 via recirculation system 26 (step 110). After decreasing the amount of air being diverted back to compressor 22 or if controller 48 determines that the calculated pressure differential is not below the second threshold pressure differential (step 108: No), step 100 may be repeated (i.e., controller 48 may receive a signal from pressure sensor 44 indicative of a pressure of the air upstream of throttle valve 28 and may receive a signal from pressure sensor 46 indicative of a pressure of the air downstream of throttle valve 28).

By regulating the pressure differential between air upstream and downstream of the throttle valve, the turbocharger's response to transient loads may be improved. In particular, because pressure of the air upstream and downstream of the throttle valve may be directly measured, a reserve of charged air may be maintained at a pressure permitting a rapid response to transient loads.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. An air induction system for a power system, comprising:
   a compressor operable to compress air directed into an engine;
   a throttle valve disposed between the compressor and the engine, the throttle valve being configured to selectively restrict the flow of compressed air into the engine;

a recirculation loop disposed between the compressor and the throttle valve, the recirculation loop including a recirculation valve configured to selectively divert a portion of the flow of compressed air away from the engine through the recirculation loop; and a controller configured to actuate the recirculation valve in response to a pressure differential between air upstream of the throttle valve and air downstream of the throttle valve to maintain a reserve of air upstream of the throttle valve at a higher pressure than a pressure of air downstream of the throttle valve, and the controller further configured to open the recirculation valve to increase an amount of air flowing through the recirculation loop when the pressure differential is above a first threshold value and to close the recirculation valve to decrease the amount of air flowing through the recirculation loop when the pressure differential is below a second threshold value different than the first threshold value, such that the reserve of air is maintained at a pressure between the first and second threshold values for rapidly responding to transient loads on the engine.

2. The air induction system of claim 1, further including a first sensor disposed between the throttle valve and the engine and configured to sense a parameter indicative of the pressure of the air downstream of the throttle valve.

3. The air induction system of claim 2, further including a second sensor disposed between the compressor and the throttle valve and configured to sense a parameter indicative of the pressure of the air upstream of the throttle valve.

4. The air induction system of claim 3, wherein the controller is configured to actuate the recirculation valve in response to signals received from the first and second sensors.

5. The air induction system of claim 1, wherein the first or second threshold value corresponds to a difference between the pressure of the air upstream of the throttle valve and the pressure of the air downstream of the throttle valve of approximately 15 percent.

6. A method for maintaining a pressure differential between air upstream and downstream of a throttle valve, the method comprising:

compressing a flow of air that flows into an engine;

sensing a first parameter indicative of a pressure of air upstream of a throttle valve;

sensing a second parameter indicative of a pressure of air downstream of the throttle valve;

selectively diverting at least a portion of the compressed air in response to a difference between the pressure of the air upstream of the throttle valve and the pressure of the air downstream of the throttle valve, wherein selectively diverting includes using a controller to:

determine the pressure differential by comparing the first parameter with the second parameter, compare the pressure differential to a first threshold and to a second threshold different from the first threshold, and either open a recirculation valve to divert more compressed air when the pressure differential is above the first threshold, or close the recirculation valve to divert less compressed air when the pressure differential is below the second threshold, to thereby maintain a reserve of charged air at a pressure between the first and second thresholds for rapidly responding to transient loads on the engine.

7. The method of claim 6, wherein at least one of the first and second thresholds corresponds to the first parameter exceeding the second parameter by approximately 15 percent.

8. The method of claim 6, wherein at least one of the first and second thresholds corresponds to the first parameter exceeding the second parameter by approximately 15.5 percent.

9. A power system, comprising:

an engine configured to produce a power output; and an air induction system configured to direct compressed air into the engine, the air induction system comprising:

a compressor operable to compress air directed into the engine;

a throttle valve disposed between the compressor and the engine, the throttle valve being configured to selectively restrict the flow of compressed air into the engine;

a recirculation loop disposed between the compressor and the throttle valve, the recirculation loop including a recirculation valve configured to selectively divert a portion of the flow of compressed air away from the engine through the recirculation loop; and a controller configured to actuate the recirculation valve in response to a pressure differential between air upstream of the throttle valve and air downstream of the throttle valve to maintain a reserve of air upstream of the throttle valve at a higher pressure than a pressure of air downstream of the throttle valve, by:

determining the pressure differential between air upstream of the throttle valve and air downstream of the throttle valve, comparing the pressure differential to a first threshold and to a second threshold different from the first threshold, and either actuating the recirculation valve to increase the flow of compressed air in the recirculation loop when the pressure differential is above the first threshold, or actuating the recirculation valve to decrease the flow of compressed air in the recirculation loop when the pressure differential is below the second threshold, to thereby maintain the reserve of air at a pressure between the first and second thresholds for rapidly responding to transient loads on the engine.

10. The power system of claim 9, further including a first sensor disposed between the throttle valve and the engine and configured to sense a parameter indicative of a pressure of the air downstream of the throttle valve.

11. The power system of claim 10, further including a second sensor disposed between the compressor and the throttle valve and configured to sense a parameter indicative of a pressure of the air upstream of the throttle valve.

12. The power system of claim 11, wherein the controller is configured to actuate the recirculation valve in response to signals received from the first and second sensors.

13. The power system of claim 9, further including an air cooler disposed between the throttle valve and the engine.

14. The power system of claim 9, wherein the controller is configured to run a software application configured to control actuation of the recirculation valve in response to the pressure differential.

* * * * *